May 31, 1938.  L. T. JOHNSON  2,119,106
WEIGHING SCALE
Filed Dec. 12, 1936  2 Sheets-Sheet 1

INVENTOR.
Leonard T. Johnson,
BY George D. Richards
ATTORNEY.

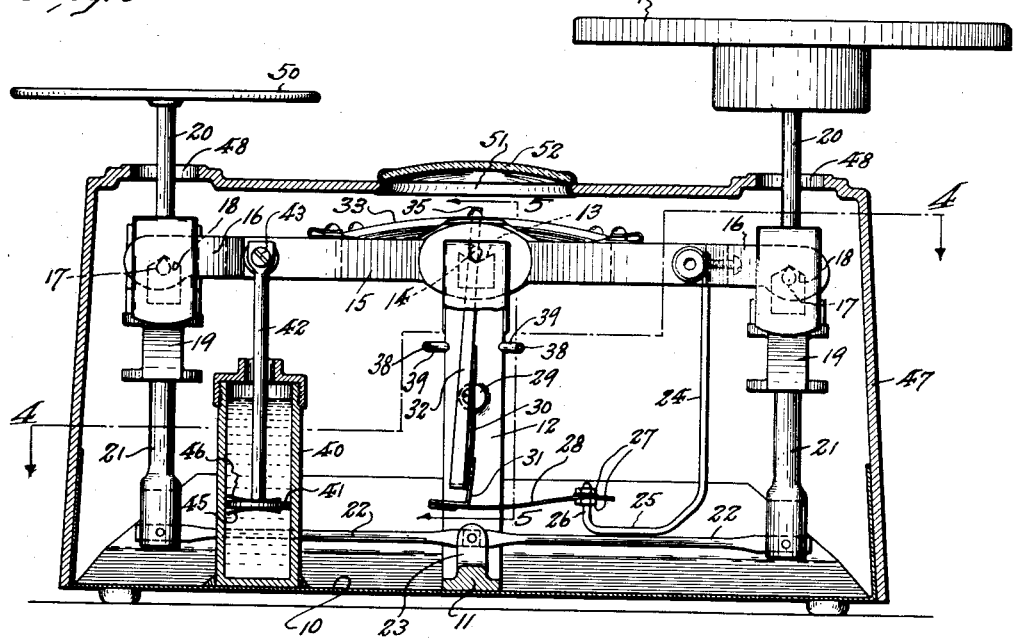

Patented May 31, 1938

2,119,106

UNITED STATES PATENT OFFICE 2,119,106

WEIGHING SCALE

Leonard T. Johnson, Maplewood, N. J.

Application December 12, 1936, Serial No. 115,507

6 Claims. (Cl. 265—54)

This invention relates, generally, to improvements in weighing scales of the even-balance pivoted beam type.

The present invention has for an object to provide a scale of the kind referred to which is equipped with visible indicating means for quickly and easily disclosing over-weight or under-weight; said means including a beam actuated pointer or indicator finger cooperative with a suitably graduated dial-plate, and a novel pivotless torsional means for transmitting beam movement to said pointer or indicator finger, said torsional means, because of its pivotless character, being initially free from all lost motion as well as proof against occurrence of lost motion due to wear and tear of use, while at the same time, due to its specific design and arrangement being extremely sensitive in response to over or under weight conditions occurring in the use of the scale.

The invention has for another object to provide novel shock-absorbing and vibration arresting means cooperative with the over and under weight pointer or indicator finger.

The invention has for another object to provide in connection with the balanced beam structure a novel arrangement of dash-pot means for stabilizing the scales against sudden jars and shocks due to hasty or carelessly rough deposit of either weights or material to be weighed upon the respective platforms by the beam ends.

Other objects of this invention, not at this time more particularly enumerated, will be understood from the following detailed description of the same.

An illustrative embodiment of this invention is shown in the accompanying drawings, in which:—

Fig. 3 is a vertical longitudinal sectional view of the improved scale; Fig. 4 is a horizontal sectional view of the same, taken on line 4—4 in Fig. 3; and Fig. 5 is a fragmentary transverse vertical section, taken on line 5—5 in Fig. 3.

Fig. 6 is a perspective view of the over and under weight pointer or indicator finger with the torsional actuating means with which it is provided.

Similar characters of reference are employed in the above-described views, to indicate corresponding parts.

Figure 1:
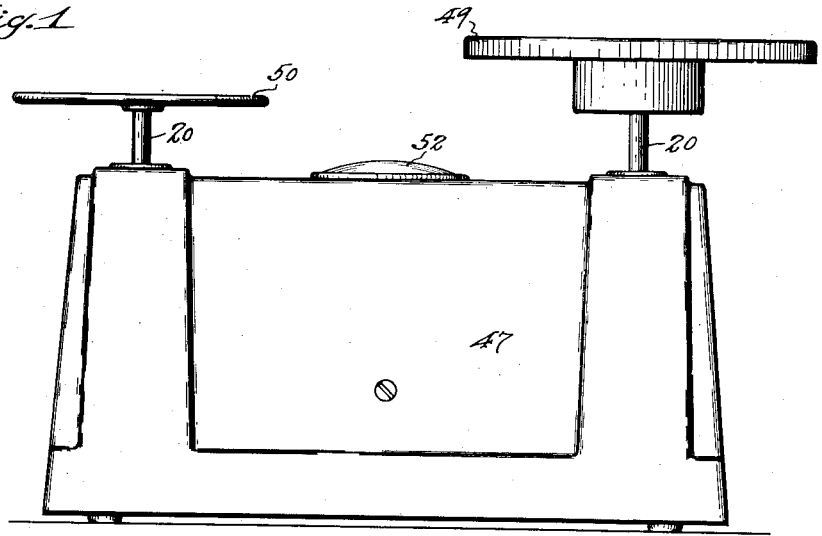
Fig. 1 is a side elevation and Fig. 2 is a top plan view of the improved scale according to this invention.
Figure 2:
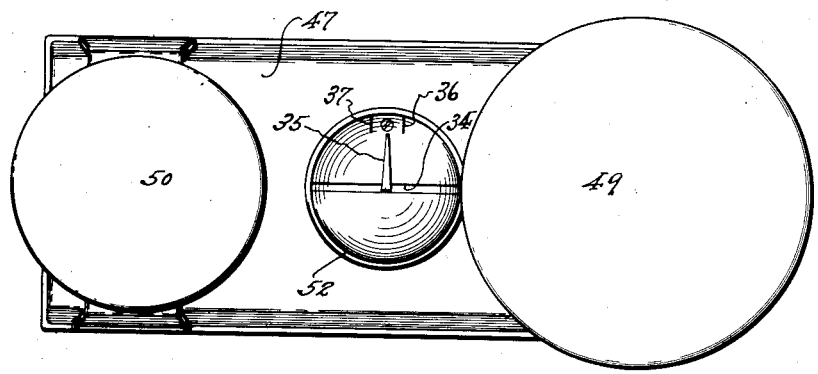

Referring to the drawings, the reference character 10 indicates the base of the scale; which may be made of any suitable material and of any suitable shape. Affixed to said base, to extend transversely across the same intermediate its ends, is the foot-piece 11 of a pair of laterally spaced upwardly projecting standards 12. Said standards 12 are provided at their upper extremities with bearing notches or seats 13 to pivotally support the knife-edge trunnions 14 of the scale beam 15, to thereby rockingly balance the latter upon the supporting standards 12.

The opposite ends of the beam 15 are respectively provided with yoke-portions 16 having laterally and oppositely projecting knife-edge trunnions 17 which engage bearing notches or seats 18 of yoke-pieces 19 which are connected with the scale platform columns 20. Each column 20 is provided with a lower end portion 21. Pivotally connected with the extremity of the lower end portion 21 of each column 20 is a check-rod 22. The inner ends of these check rods 22 are pivotally anchored to an anchor lug 23 which projects upwardly from the foot-piece 11 of standards 12.

Secured to and extending downwardly from one end portion of the beam 15 is an arm 24 having at its lower end an angular extension 25 extending toward the beam supporting standards 12. Said extension 25 is provided at its extremity with an upturned threaded post 26 upon which are engaged fastening nuts 27. Secured to said post 26 by and between said fastening nuts 27 is a substantially horizontal leaf spring or torsional element 28. Secured to an anchor stud 29, provided to project from one of the standards 12, is the upper end of a substantially vertical leaf spring or torsional element 30. Adjacent free end portions of said springs or torsional elements 28 and 30 are fixedly united together.

This is preferably accomplished by means of an angle-piece 31, the horizontal portion of which is fixedly secured in meeting relation to the free end portion of said horizontal spring or torsional element 28, while the vertical portion of the same is fixedly secured in meeting relation to the free end portion of said vertical spring or torsional element 30. The method of so fastening said springs or torsional elements and angle-piece 31 together may optionally comprise riveting, bolting, spot-welding or any other suitable or convenient method. Affixed to the lower end portion of said vertical spring or torsional element 30, by any suitable means of union, is the butt end of an upwardly extending pointer or indicator finger 32. It will be obvious, from the above description and an inspection of the drawings, that there are no loose or pivotal connections either between the elements of the torsional actuating means, or between the latter and the scale beam parts or the supporting standard means for said scale beam.

Arranged upon the top of the beam 15, and suitably secured thereto, is a dial plate 33 which is provided with a longitudinal slot or way 34 through which the upper end of the pointer or indicator finger 32 extends. The extremity of said pointer or indicator finger 32 is provided with an angular or laterally projecting indicator point 35 which overhangs and is movable along the dial plate in either direction from the centered or scale balanced position. The dial plate 33 is suitably inscribed with one or more marks or graduation groups 36 and 37 respectively disposed to indicate over-weight or under-weight movement of the scale beam relative to its even balanced position.

Since the pointer or indicator finger 32 is wholly supported by the sensitive torsional actuating connection affixed between the scale beam 15 and one of the scale beam supporting standards 12, any sudden movements imparted to the scale beam 15 tending to suddenly throw the pointer or indicator finger 32 to one extreme or the other of its movement would tend to cause the latter to vibrate more or less rapidly for an appreciable time, even after the beam 15 returns to even balanced position. This is objectionable and makes for delay before the scale can be read for either over-weight or under-weight indication, since it is necessary to wait for the induced vibration of the pointer or indicator finger to subside before an accurate and reliable reading of the ultimate indicating position thereof can be attained. A feature of this invention includes means to overcome and arrest such undesired wild vibration of the pointer or indicator finger. The means accomplishing this comprises a pair of resilient arms 38 which are affixed to a standard 12 and respectively so disposed that the free end portion of one arm lies within the path of movement of the pointer or indicator finger adjacent to the limit of its over-weight indicating swing, while the free end portion of the other arm lies within the path of movement of the pointer or indicator finger adjacent to the limit of its under-weight indicating swing. When the pointer or indicator finger strikes against either the one or the other of these arms 38, as the case may be, any tendency to wild or violent vibration thereof is immediately arrested, and the same will move quietly back, with substantially no vibration, when the beam 15 swings to normal even balanced position. If desired, the free end portions of the resilient arms 38 may be and preferably are clothed in a soft resilient covering 39, such e. g., as sleeves or tubes of soft rubber.

Means are provided for stabilizing the scale beam 15 and associated parts against too sudden and jarring or shocking movements which might tend to upset the ability of the beam to return to rest in normal even balance. This stabilizing means comprises a dash-pot structure consisting of a vertical disposed cylinder 40 mounted on the base 10 beneath one of the beam arms. Vertically movable in the cylinder 40 is a plunger piston 41, the stem or rod 42 of which projects out of the upper end of cylinder 40 toward the adjacent beam arm. The upper extremity of said stem or rod 42 is pivotally connected with the adjacent beam arm by suitable means, such as the attachment and pivoting screw 43. The piston or plunger 41 is provided with one or more through ports 44. Suitably secured to the under side of said piston or plunger 41 is a down-stroke check comprising a valve flap means 45 disposed in alignment with the lower mouth or mouths of the port or ports 44. Said valve flap means 45 is made of some resilient sheet material, such e. g. as a springy sheet metal, which is of such normal initial shape and disposition that its inherent tension operates to normally hold the same downwardly spaced away from the lower mouth or mouths of the port or ports 44 so that the latter are normally open. Said valve flap means 45 is yieldable however to sudden upward pressure, and consequently under such suddenly applied pressure will move to close the port or ports 44, thus being effective to check sudden or violent downward movement of the piston or plunger 41 and of the adjacent beam arm to which it is connected. The normal tension of said valve flap means 45 is such however that it will resist closing movement and thereby allow the port or ports 44 to remain open during relatively slow downward movement of the piston or plunger as imparted thereto by normal beam movement. In like manner, suitably secured to the upper side of said piston or plunger 41 is an up-stroke check comprising a valve flap means 46 disposed in alignment with the upper mouth or mouths of the port or ports 44. Said valve flap means 46 is likewise made of some resilient sheet material, such as springy metal or the like and so shaped as to normally space itself in open relation to the upper mouth or mouths of said port or ports 44, subject to movement to closed relation to the latter under sudden downward pressure to thereby check sudden or violent upward movement of the piston or plunger 41 and the adjacent beam arm connected therewith. The normal tension of valve flap means 46 is such that it will also resist closing movement and thereby allow the port or ports 44 to remain open during relatively slow upward movement of the piston plunger as imparted thereto by normal beam movement.

Preferably, the scale mechanism is enclosed within a surrounding housing 47, suitably attached to and supported by the base 10. This housing 47 is provided in its upper or top wall with openings 48 through which extend the upwardly projecting ends of the platform columns 20. To the respective columns 20 are affixed the respective goods receiving platform 49 and the measuring weight receiving platform 50. The top wall of said housing 47 is also provided with an opening 51 aligned above the dial plate 33, said opening being closed by a transparent panel 52 of glass or other suitable material. The opening 51 permits inspection of the movement of the indicator point 35 relative to the dial plate 33.

It will be understood that various changes could be made in the above described constructions, and that many apparently widely different embodiments of this invention could be made without departing from the scope thereof as defined by the following claims. It is therefore intended that all matter contained in the above description or shown in the accompanying drawings shall be interpreted as illustrative and not in a limiting sense.

I claim:—

1. In a scale, a stationary frame structure, a beam fulcrumed thereon, a unitary torsional means comprising angularly related portions rigidly connected one with the other, one portion of said torsional means being fixedly connected with the stationary frame structure and another portion thereof being fixedly connected to the beam, an indicator means connected with and actuated by the flexing of said torsional means caused by beam movement, and a dial plate with which said indicator means cooperates.

2. In a scale, a stationary frame structure, a beam fulcrumed thereon, a unitary torsional means comprising angularly related portions rigidly connected one with the other, one portion of said torsional means being fixedly connected with the stationary frame structure and another portion thereof being fixedly connected to the beam, an indicator means connected with and actuated by the flexing of said torsional means caused by beam movement, a dial plate with which said indicator means cooperates, and a pair of yieldable bumper arms affixed to said frame structure to project respectively across the path of oscillation of said indicator means and respectively engageable by the latter somewhat within the limits of oscillatory movement thereof.

3. In a scale, a pivotally mounted evenly balanced beam, an angular torsional means comprising a substantially vertical flexible arm and a substantially horizontal flexible arm, said arms having adjacent ends rigidly connected together, the horizontal arm being disposed substantially parallel to the beam and the vertical arm being disposed substantially perpendicular to the beam, means for fixedly anchoring the outer end of said vertical arm, means carried by said beam to which the outer end of said horizontal arm is rigidly connected, a vertical indicator finger attached to said torsional means adjacent to the conjoined ends of its arms, and a dial plate with which said finger cooperates, said finger being swingingly movable in either direction from a neutral position determined by the even-balance position of said beam by the flexing of said angular torsional means caused by transmission to the latter of movements of said beam from even-balance position.

4. In a scale, a standard means, a beam centrally fulcrumed for even balance on said standard means, a member rigidly connected with one arm of said beam to depend therefrom, an angular torsional means comprising a substantially vertical flexible arm and a substantially horizontal flexible arm, said arms having adjacent ends rigidly connected together, means for anchoring the outer end of said vertical arm to said standard, means for affixing the outer end of said horizontal arm to said member depending from said beam, a vertical indicator finger attached to said torsional means adjacent to the conjoined ends of its arms, and a dial plate with which the free end portion of said indicator finger cooperates.

5. In a scale, a standard means, a beam centrally fulcrumed for even balance on said standard means, a member rigidly connected with one arm of said beam to depend therefrom, an angular torsional means comprising a substantially vertical flexible arm and a substantially horizontal flexible arm, said arms having adjacent ends rigidly connected together, means for anchoring the outer end of said vertical arm to said standard, means for affixing the outer end of said horizontal arm to said member depending from said beam, a vertical indicator finger attached to said torsional means adjacent to the conjoined ends of its arms, and a dial plate with which the free end portion of said indicator finger cooperates, said dial plate being centrally mounted upon and secured to said beam.

6. In a scale, a standard means, a beam centrally fulcrumed for even balance on said standard means, a member rigidly connected with one arm of said beam to depend therefrom, an angular torsional means comprising a substantially vertical flexible arm and a substantially horizontal flexible arm, said arms having adjacent ends rigidly connected together, means for anchoring the outer end of said vertical arm to said standard, means for affixing the outer end of said horizontal arm to said member depending from said beam, a vertical indicator finger attached to said torsional means adjacent to the conjoined ends of its arms, a dial plate with which the free end portion of said indicator finger cooperates, and a pair of yieldable bumper arms affixed to said standard to project respectively across the opposite paths of oscillation of said indicator finger and engageable by the latter somewhat within the limits of outward swinging movements of the indicator finger from its normal central position.

LEONARD T. JOHNSON.